(No Model.)
J. E. A. GIBBS.
TENSION APPARATUS FOR SEWING MACHINES.
No. 413,657. Patented Oct. 29, 1889.
FIG. I.
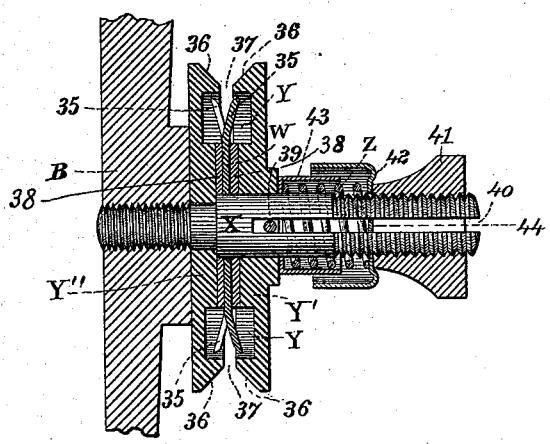
FIG. II.
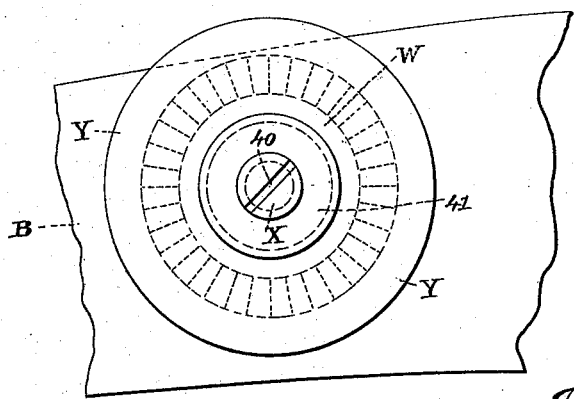
Attest:
Geo. T. Smallwood
Philip Mauro
Inventor
James E. A. Gibbs by
A. Pollok
his attorney.
N. PETERS, Photo-Lithographer, Washington, D. C.

UNITED STATES PATENT OFFICE.

JAMES E. A. GIBBS, OF RAPHINE, VIRGINIA, ASSIGNOR TO THE WILLCOX & GIBBS SEWING MACHINE COMPANY, OF NEW YORK, N. Y.

TENSION APPARATUS FOR SEWING-MACHINES.

SPECIFICATION forming part of Letters Patent No. 413,657, dated October 29, 1889.

Application filed June 18, 1888. Serial No. 277,441. (No model.)

*To all whom it may concern:*

Be it known that I, JAMES E. A. GIBBS, of Raphine, in the county of Rockbridge and State of Virginia, have invented a new and useful Improvement in Tension Apparatus for Sewing-Machines, which improvement is fully set forth in the following specification.

This invention relates to that class of tension apparatus for sewing-machines in which the sewing-thread passes around a grooved wheel or pulley, and the friction or yielding pressure to regulate the tension on the thread is applied to said wheel or pulley instead of directly to the thread. This wheel or pulley it is desirable should be very light in order that its inertia may not disturb the uniformity of the tension, and it is sometimes, if not commonly, made of a thin disk slotted at the edge to form teeth, which are bent outward alternately on opposite sides, leaving a V-shaped groove between them. In the practical use of such tension apparatus it requires some little care to insert the thread in the groove, and the wheel or pulley is very apt to be accidentally bent or otherwise injured.

According to the present invention the wheel or pulley is inclosed in a casing with flanges or projections that cover the edges of the groove in said wheel or pulley, leaving a slit or slot between them for the introduction of the thread. This casing may be made as strong as may be necessary to prevent it from being easily bent or broken and to afford protection to wheel or pulley inside against ordinary accidents, and the flanges or projections assist the operator in introducing the thread into the groove of the pulley. To increase the assistance thus rendered, the outside of one or both said flanges or projections may be sloped inward toward the slit or slot in said casing.

The invention extends generally to a tension apparatus having the grooved wheel or pulley for the thread inclosed in a casing, as just described; but it particularly covers such tension when either or both the following features are employed, namely: when the grooved wheel or pulley is formed of a disk slotted at the edges, with the teeth thus formed bent in opposite directions, and when the outside of one or both the flanges or projections on the casing is sloped inward to the slit or slot between them.

The invention also comprises a special mode of constructing the casing and combining it with the means for producing friction on the wheels, the nature of which can most conveniently be described in a later part of this specification.

The accompanying drawings, which form part of this specification, represent a tension apparatus constructed in accordance with the invention, Figure I being an axial section, and Fig. II a front elevation.

The wheel W is formed of a disk with its edge slotted or slitted and the teeth 35 bent outward alternately on opposite sides, leaving a V-shaped groove between them. It is mounted on a tension-stud X, screwed into the machine-frame B, and is inclosed in the casing Y, having flanges or projections 36, which cover the edges of the groove in the wheel or pulley W, leaving a slit or slot 37 for the insertion of the thread.

As shown, the edges of the groove are formed by the ends of the teeth 35. As these are covered by the flanges or projections 36, there is no danger of their catching the thread when the thread is introduced. The outside of one or both the flanges or projections 36 is or may be sloped inward toward the slit or slot 37, so as to direct the thread into the same with the least care on the part of the operator.

The casing could be made in any suitable way. As shown, it is in two parts or casing-disks Y' Y'' on opposite sides of the wheel or pulley W, and one of said parts or disks Y' is interposed between said wheel or pulley and the tension-spring Z and is movable toward and away from the said wheel or pulley, so as to convey thereto the pressure of the said tension-spring Z. The part or disk Y'', being stationary, can be formed of or replaced by a portion of the frame B, provided with a suitable flange or projection, such as shown at 36. This mode of constructing the casing and combining it with the other parts constitutes a special feature of the invention whether the stationary or inner disk is or is not a separate piece from the supporting-frame. The adjustment of the pressure of the spring Z regulates the tension part upon the thread. Friction-washers 38, of cloth or other suitable material, are inserted between the wheel or pulley W and the parts or disks of the casing.

The disk Y″ or stationary part of the casing, if separate from the frame B, may be clamped against said frame by a shoulder on the stud X, or it may be otherwise held from rotation. The disk Y′, mounted on the stud X, has a pin 39 fixed therein and extending through the slot 40 in the stud X; but any appropriate means of preventing its rotation could be used instead which would allow it to move lengthwise of the stud X for applying the necessary pressure to the wheel or pulley W. The pressure could be applied to the movable disk Y′ in any suitable way. As shown, the tension-spring Z is placed around the stud X between the movable disk Y′ and the nut 41 on the end of said stud, and there is a non-rotating cup 42, which fits over the outer end of the spring Z and forms a bearing which prevents the rotation of the nut from turning the tension-spring. A non-rotating bearing-piece of any suitable form would serve the same purpose; but it is preferred to have it in the form of a cup, so as to protect the spring and to give a finish to the apparatus. With these latter objects the inner end of the spring is also set in a cup 43. The cup or bearing-piece 42 is prevented from rotating by a portion 44 thereof fitting in the slot 40 of the stud X. The cups 42 and 43 might both be omitted.

The new or improved tension apparatus is or may be used as such apparatus are commonly employed in sewing-machines.

The following expressions, as hereinafter employed—namely, first, means for applying friction to the grooved wheel or pulley, and, second, means whereby the casing is kept from turning with said wheel—are not to be understood as limited to the precise means shown in the drawings and described in reference thereto, but as covering means in general for the purposes specified, the invention extending generally to a wheel-tension apparatus provided with a non-rotating casing, as hereinbefore set out.

I claim as my invention or discovery—

1. A tension apparatus composed of, first, a rotary grooved wheel or pulley for the thread; second, means for applying friction to said wheel or pulley; third, a casing with portions thereof on opposite sides of said wheel or pulley and provided with flanges or projections that cover the edges of the groove in said wheel or pulley, leaving a slit or slot for the insertion of the thread, and, fourth, means whereby the portion of the casing on the outside of the wheel or pulley, as well as the inside portion thereof, is kept from turning with said wheel or pulley, substantially as described.

2. A tension apparatus having a rotary grooved wheel or pulley formed of a disk with the edge slit and the teeth thus formed bent in opposite directions, and a casing with flanges or projections that cover the edges of the groove, leaving a slit or slot between them and having the outside of one at least of said flanges sloped inward toward the slit or slot, the said tension being further provided with means for applying friction to the said wheel or pulley and with means whereby the said casing is kept from turning with the wheel or pulley, substantially as described.

3. A tension apparatus comprising, in combination with a rotating grooved wheel or pulley and a tension-spring for applying pressure thereto, a non-rotating two-part casing having flanges or projections over the edges of the groove in said wheel or pulley, leaving a slit or slot between them for the insertion of the thread, one of said flanged parts being interposed between the said wheel or pulley and the said tension-spring, and being movable toward and away from the said wheel or pulley, so as to convey thereto the pressure of said spring, substantially as described.

4. The combination, with the tension-stud and grooved wheel or pulley, of the non-rotating casing-disks or parts of the casing, one of them movable lengthwise of said stud and both provided with flanges or projections over the edges of the groove in said wheel or pulley, the friction-washers, the tension-spring, and the nut, substantially as described.

In testimony whereof I have signed this specification in the presence of two subscribing witnesses.

JAS. E. A. GIBBS.

Witnesses:
C. P. BOWMAN,
E. ALEXANDER.